United States Patent
Zhu et al.

(10) Patent No.: US 10,014,020 B2
(45) Date of Patent: *Jul. 3, 2018

(54) ADAPTIVE WRITE FAULT THRESHOLDS

(71) Applicant: SEAGATE TECHNOLOGY LLC, Cupertino, CA (US)

(72) Inventors: Wenzhong Zhu, Apple Valley, MN (US); Kenneth A. Haapala, Plymouth, MN (US); Bin Huang, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/591,270

(22) Filed: May 10, 2017

(65) Prior Publication Data

US 2017/0243609 A1    Aug. 24, 2017

Related U.S. Application Data

(63) Continuation of application No. 14/977,313, filed on Dec. 21, 2015, now Pat. No. 9,691,418.

(51) Int. Cl.
*G11B 5/596* (2006.01)
*G11B 20/18* (2006.01)

(52) U.S. Cl.
CPC .......... *G11B 5/59627* (2013.01); *G11B 20/18* (2013.01)

(58) Field of Classification Search
None
See application file for complete search history.

(56) References Cited

U.S. PATENT DOCUMENTS

| | | | |
|---|---|---|---|
| 7,203,021 B1 | 4/2007 | Ryan et al. | |
| 7,499,232 B2 | 3/2009 | Hodge et al. | |
| 7,508,616 B2 | 3/2009 | Fitzpatrick et al. | |
| 7,633,698 B2 | 12/2009 | Finamore et al. | |
| 8,937,777 B2 | 1/2015 | Bui et al. | |
| 9,087,540 B1 | 7/2015 | Lee et al. | |
| 9,099,155 B1 | 8/2015 | Kataria et al. | |
| 9,691,418 B1 * | 6/2017 | Zhu .......................... | G11B 5/40 |

* cited by examiner

*Primary Examiner* — K. Wong
(74) *Attorney, Agent, or Firm* — Holland & Hart LLP (57) ABSTRACT

Systems and methods for determining a relationship between write fault threshold and temperature are described. The systems and methods include measuring an operating temperature of the storage device, determining a current operating temperature of the storage device, determining whether the current operating temperature of the storage device satisfies a temperature threshold, and upon determining the current operating temperature of the storage device satisfies the temperature threshold, modifying a write fault threshold associated with a data track of the storage device.

20 Claims, 7 Drawing Sheets

ADAPTIVE WRITE FAULT THRESHOLDS

RELATED APPLICATIONS

This application is a continuation of U.S. patent application Ser. No. 14/977,313, filed on 21 Dec. 2015 and entitled ADAPTIVE WRITE FAULT THRESHOLDS, now U.S. Pat. No. 9,691,418, issued on 27 Jun. 2017, the disclosure of which is incorporated in its entirety by this reference.

SUMMARY

The present disclosure is directed to methods and systems for adaptive write fault thresholds. In some embodiments, the present systems and methods may modify a fault tolerance of a write operation performed by a storage drive's magnetic head.

A storage device for adaptive write fault thresholds is described. In one embodiment, the storage device may include a storage medium comprising one or more data tracks, a temperature sensor to measure an operating temperature of the storage device, and a storage controller to determine, in conjunction with the temperature sensor, a current operating temperature of the storage device, determine whether the current operating temperature of the storage device satisfies a temperature threshold, and upon determining the current operating temperature of the storage device satisfies the temperature threshold, modify a write fault threshold associated with a data track from the one or more data tracks.

In some embodiments, the write fault threshold may be configured in relation to a write operation to the data track performed by a magnetic head of the storage device. In some cases, the write fault threshold may be based at least in part on a total width of the data track. In some configurations, the write fault threshold may be based at least in part on a percentage of the total width of the data track and a measured width of variation in relation to a centerline of the data track. In one embodiment, the storage controller may identify an upper temperature threshold and a lower temperature threshold.

In some embodiments, the storage controller may compare the current operating temperature of the storage device to the upper and lower temperature thresholds. In some cases, the storage controller may increase the write fault threshold when the current operating temperature drops below the lower temperature threshold, decrease the write fault threshold when the current operating temperature rises above the upper temperature threshold, and maintain the write fault threshold when the current operating temperature remains at or above the lower temperature threshold and at or below the upper temperature threshold. In some embodiments, the storage controller may configure a first write fault threshold in an inner diameter (ID) direction of a centerline of at least one of the one or more data tracks, and configure a second write fault threshold in an outer diameter (OD) direction of the centerline of the at least one of the one or more data tracks, the second write fault threshold being different than the first write fault threshold.

A method for adaptive write fault thresholds is also described. In one embodiment, the method may include determining a current operating temperature of the storage device, determining whether the current operating temperature of the storage device satisfies a temperature threshold, and upon determining the current operating temperature of the storage device satisfies the temperature threshold, modifying a write fault threshold associated with a data track of the storage device.

An apparatus for adaptive write fault thresholds is also described. In one embodiment, the apparatus may include a processor, memory in electronic communication with the processor, and instructions stored in the memory, the instructions being executable by the processor to perform the steps of measuring an operating temperature of the storage device, determining a current operating temperature of the storage device, determining whether the current operating temperature of the storage device satisfies a temperature threshold, and upon determining the current operating temperature of the storage device satisfies the temperature threshold, modifying a write fault threshold associated with a data track of the storage device.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The following relates generally to adaptive write fault thresholds. A storage drive such as a hard disk drive (HDD)

may include a recording sub-system (RSS) that includes one or more disk platters, a head transducer for disk reads and writes (e.g., magnetic read sensor and write element), a preamplifier integrated circuit (IC) to provide gain for signal output and biasing for the head's magnetic sensors, and a read channel integrated circuit for digitization of read data by converting analog signals read by the head into digital data.

Encroachment and adjacent track interference (ATI) are two RSS failure modes in HDDs. Encroachment (i.e., adjacent track encroachment or adjacent track erasure, etc.) may occur as a result of relatively high data track density where the concentric data tracks are placed closer and closer together as technology advances. In some cases, the write element on a magnetic head may be wider than a data track. As the write element performs a write operation, a portion of the write element (e.g., the fringe field) may overlap onto tracks adjacent to the track being written. This encroachment into the adjacent track may result in added noise and/or degradation of the data already written to the adjacent track. Eventually, the data written to the adjacent track may become degraded after a certain number of write operations to other tracks, which may result in an increase in bit error rate (BER), resulting in degradation of the performance and reliability of the HDD.

In some embodiments, the systems and methods may use variable bit aspect ratio (VBAR) to adjust track pitch and data rate to maximize drive data processing capacity. With VBAR, the write width of a transducer head is determined. A tracks per inch value may be adjusted based on the write width, and a data transfer rate may be adjusted based on the adjusted tracks per inch value. In particular, the data transfer rate may be adjusted such that the adjusted tracks per inch value and the adjusted data transfer rate provide a capacity for the head that is equal to a nominal capacity.

In one embodiment of the VBAR process a storage drive's track per inch capability (TPIC) may be measured to prevent encroachment and the storage drive's iterative track per inch capability (ITPIC) may be measured to prevent ATI. Thus, using VBAR, a TPIC value may be selected to mitigate encroachment and an ITPIC value may be selected to mitigate ATI. Both encroachment and ATI are temperature dependent, and become worse when temperature increases. In some cases, an adaptive direct offline scan (DOS) threshold may be used to mitigate ATI. With DOS, an incremented write count of the affected region may be scaled by a scalar value to obtain a new increment write count. A defective data scan may be performed on the affected region if the new increment write count exceeds a default write count threshold. Thus, DOS may be used to mitigate ATI based on temperature. However, adaptive DOS does not mitigate encroachment. Previous to the advancements disclosed herein, no effective solution existed to mitigate encroachment based on temperature.

Write fault thresholds, also referred to as on-cylinder limits (OCLIMs), may be established on opposing sides of a track's centerline. During a write operation to a track of a storage drive's disk, the head's write element may be positioned so as to be nominally centered over the track's centerline as the disk platter rotates adjacent the head. Likewise, during a read operation, the head's read element may generally be positioned to follow the track's centerline as well. Should the write element exceed a specified write fault threshold, a write fault interrupt may be declared and further writing may be temporarily suspended until the position error of the head is determined to be smaller than the write fault threshold. Example write fault thresholds may be on the order of anywhere between 10% to 20% of a track's total width, although other values greater or less than these may be used. Ideally, the head's read/write elements would travel perfectly over the track's centerline at all times. In practice, the position of the head over a track is constantly fluctuating to some degree from the track's centerline due in part to the nanoscale track widths (e.g., 30-50 nanometers per track). As the head's write element performs a write operation the position of the head's write element may vary from the track's centerline. For example, during the write operation, the position of the head's write element may drift inward from the centerline towards the inner diameter (ID) of the disk platter and/or may drift outwards from the centerline towards the outer diameter (OD) of the disk platter, all while remaining within the total width of the track. Some variation is permissible so long as the variance does not affect data on adjacent tracks. Thus, a limit to this variance may be referred to as the on-cylinder limit or OCLIM based on predetermined write fault thresholds. For example, a storage drive may be configured with a 15% write fault threshold. The 15% write fault threshold may refer to 15% of the track's total width in relation to a position over the track's centerline. The 15% value may indicate the degree of variance permitted during a write operation before a write fault is triggered. Thus, in one embodiment, a 15% write fault threshold may indicate the head's read/write elements may drift 15% towards ID (−15%) and/or may drift 15% towards OD (+15%) from the track's centerline before a write fault is triggered. Additionally, or alternatively, the limit of allowable variance may be given in relation to a certain width from the centerline. For example, a storage drive may be configured with a 10 nanometer (nm) write fault threshold. Thus, in one embodiment, a 10 nm write fault threshold may indicate the head's read/write elements may drift 10 nm towards ID (−10 nm) and/or may drift 10 nm towards OD (+10 nm) from the track's centerline before a write fault is triggered. In some embodiments, a write fault may be triggered when the variance reaches 10 nm. Alternatively, a write fault may be triggered when the variance exceeds 10 nm.

In one embodiment, the present systems and methods adjust the write fault threshold based on operating temperature to optimize storage drive performance and mitigate encroachment. Specifically, in one embodiment of the systems and methods described herein, the write fault threshold may be adjusted based on a storage drive's operating temperature where the write fault threshold is reduced as temperature increases. For example, the write fault threshold may be set at 18% of a track's total width when a drive's operating temperature is at or near 25° C., modified to 17% when the drive's operating temperature is at or near 35° C., modified to 16% when the drive's operating temperature is at or near 45° C., modified to 15% at 55° C., modified to 14% at 65° C., and so forth, thus optimizing the drive performance and mitigating encroachment. In one embodiment, the systems and methods described herein apply to both symmetrical and asymmetrical write fault thresholds.

Figure 1:
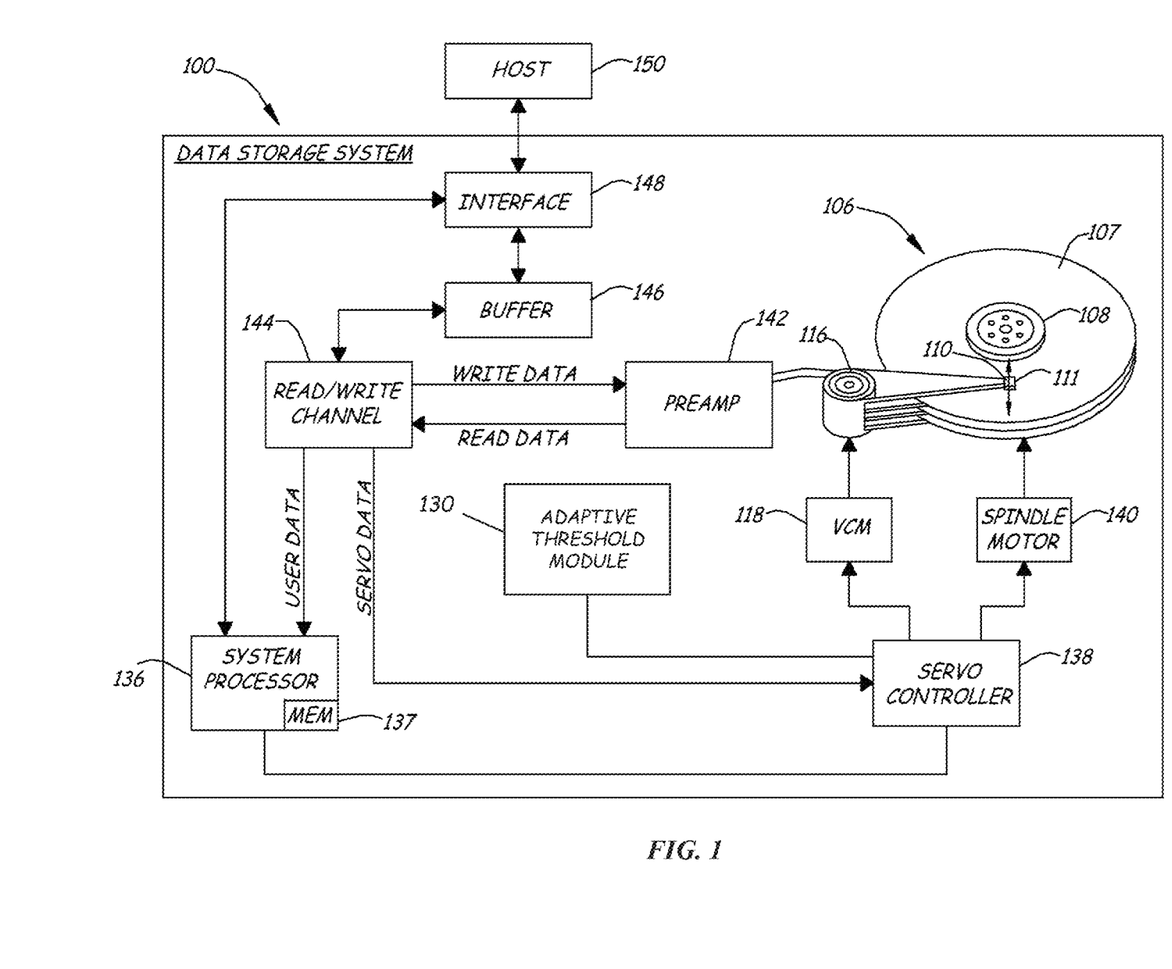
FIG. 1 is a block diagram of an example of a system in accordance with various embodiments.

FIG. 1 illustrates a block diagram of a data storage system 100 under one embodiment. Data storage system 100 includes media 106, such as a plurality of disks 107, which are mounted on a spindle motor 140 by a clamp 108. Each media surface has an associated slider 110, which carries a read/write head 111 for communication with the media surface. Sliders 110 are supported by suspensions and track accessing arms of an actuator mechanism 116. For example, actuator mechanism 116 can be of the type known as a rotary moving coil actuator and includes a voice coil motor (VCM)

118. VCM 118 rotates actuator 116 about a pivot shaft to position sliders 110 over a desired data track along an arcuate path between an inner diameter (ID) and an outer diameter (OD) of, for example, a disk medium. VCM 118 is driven by electronic circuitry based on signals generated by the read/write heads and a host computer 150.

As previously discussed, media 106 can includes a plurality of disks 107. Each disk 107 has a plurality of substantially concentric circular tracks. Each track is subdivided into a plurality of storage segments. As defined herein, a storage segment is the basic unit of data storage in media 106. Each storage segment is identified and located at various positions on media 106. In the disc-type media example, storage segments or data sectors are "pie-shaped" angular sections of a track that are bounded on two sides by radii of the disk and on the other side by the perimeter of the circle that defines the track. Each track has related logical block addressing (LBA). LBA includes a cylinder address, head address and sector address. A cylinder identifies a set of specific tracks on the disk surface to each disk 107 which lie at equal radii and are generally simultaneously accessible by the collection of heads 111. The head address identifies which head can read the data and therefore identifies which disk from the plurality of disks 107 the data is located. As mentioned above, each track within a cylinder is further divided into sectors for storing data and servo information. The data sector is identified by an associated sector address.

Data storage system 100 includes a system processor 136, which is used for controlling certain operations of data storage system 100 in a known manner. In one embodiment, system processor 136 is also used for carrying out data recovery of flawed data sectors. The various operations of data storage system 100 are controlled by system processor 136 (e.g., storage controller) with the use of programming and/or instructions stored in memory 137. Data storage system 100 also includes servo controller 138 which generates control signals applied to VCM 118 and spindle motor 140. System processor 136 instructs servo controller 138 to seek head 111 to desired tracks. Servo controller 138 is also responsive to servo data, such as servo burst information recorded on disk 107.

Disk drive 100 further includes preamplifier (preamp) 142 for generating a write signal applied to head 111 during a write operation, and for amplifying a read signal emanating from head 111 during a read operation. A read/write channel 144 receives data from system processor 136 during a write operation, and provides encoded write data to preamplifier 142. During a read operation, read/write channel 146 processes a read signal generated by preamp 142 in order to detect and decode data recorded on disk 107. The decoded data is provided to system processor 136 and ultimately through interface 148 to host computer 150.

In some configurations, system 100 may include an adaptive threshold module 130. In one example, the system 100 may be a component of a host (e.g., operating system, host hardware system, etc.). Adaptive threshold module 130 may modify a write fault threshold associated with a write operation performed by head 111 based on an operating temperature of the system 100 and/or a host of system 100.

Figure 2:
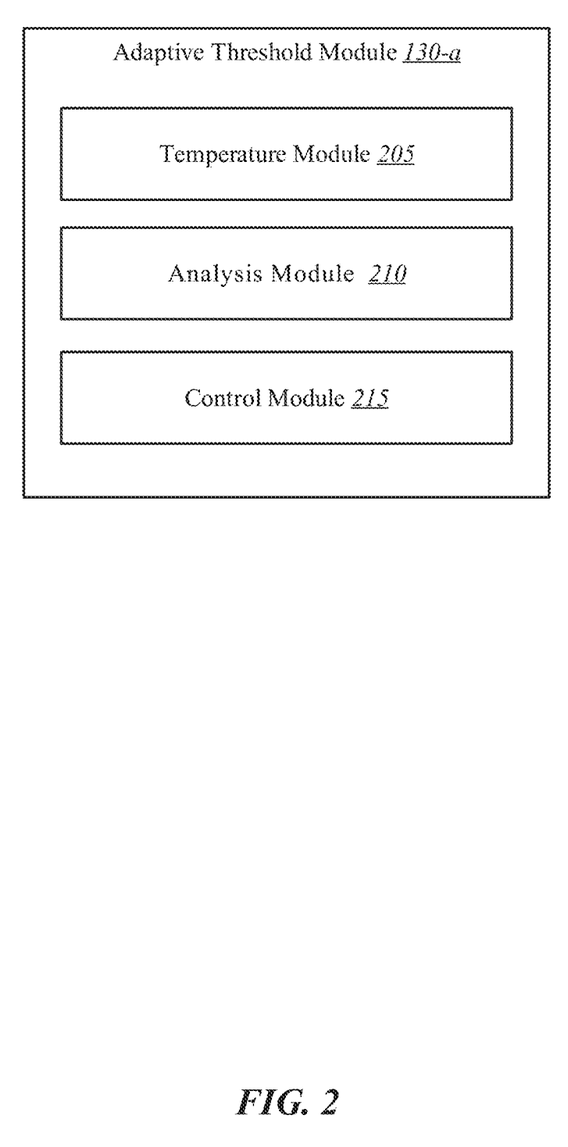
FIG. 2 shows a block diagram of a module in accordance with various aspects of this disclosure.

FIG. 2 shows a block diagram 200 of an adaptive threshold module 130-*a*. The adaptive threshold module 130-*a* may include one or more processors, memory, and/or one or more storage devices. The adaptive threshold module 130-*a* may include temperature module 205, analysis module 210, and control module 215. The adaptive threshold module 130-*a* may be one example of adaptive threshold module 130 of FIG. 1. Each of these components may be in communication with each other.

In one embodiment, temperature module 205 may monitor an operating temperature of the storage device. Thus, the temperature module 205 may determine a current operating temperature of the storage device and/or a host of the storage device. In some embodiments, temperature module 205 may configure one or more temperature thresholds. In one embodiment, analysis module 210 may determine whether the current operating temperature of the storage device satisfies a temperature threshold. Upon determining the current operating temperature of the storage device satisfies the temperature threshold, control module 215 may modify a write fault threshold associated with a data track on a storage medium of a storage device. The data track may have a certain width with an inner diameter (ID) edge and an outer diameter (OD) edge. In some cases, the write fault threshold may be configured in relation to a write operation to the data track performed by a magnetic head of a storage device. The write fault threshold may be based on a total width of the data track. The concentric data track around the surface of the storage medium may be referred to as a cylinder and the concentric center of this data track or cylinder may be referred to as the centerline of the data track. In some embodiments, the write fault threshold may be based on a percentage of the total width of the data track in relation to the centerline of the data track. Thus, a data track may have a width of X nanometers (nm) and the write fault threshold may be configured to be some percentage value of the width X nm (e.g., from 1% to 25% of X nm). For example, given a track width of 50 nm, the write fault threshold may be set to 10% of 50 nm, or 5 nm. In one embodiment, a data track with a 5 nm write fault threshold may indicate that a magnetic head performing a write operation to this data track may drift up to 5 nm in either the ID direction (−5 nm) or the OD direction (+5 nm) away from the data track's centerline. If the magnetic head exceeds the 5 nm write fault threshold, a write fault error may be triggered, resulting in the write operation being terminated or suspended. In one embodiment, the write fault may be triggered when the magnetic head is at or beyond the write fault threshold (e.g., greater than or equal to 5 nm from the centerline in the ID or OD direction). Additionally, or alternatively, the write fault may be triggered when the magnetic head is only beyond the write fault threshold (e.g., greater than 5 nm from the centerline in the ID or OD direction). In some embodiments, control module 215 may store a current value of the write fault threshold in a non-volatile storage medium of the storage device such as a hard disk drive, solid state memory, flash memory, etc.

In some embodiments, the temperature module 205 may identify an upper temperature threshold and a lower temperature threshold. In some embodiments, analysis module 210 may compare the current operating temperature of the storage device to the upper and lower temperature thresholds. In one embodiment, control module 215 may increase the write fault threshold when the current operating temperature drops below the lower temperature threshold. In some embodiments, control module 215 may decrease the write fault threshold when the current operating temperature rises above the upper temperature threshold. In some configurations, control module 215 may maintain the write fault threshold when the current operating temperature remains at or above the lower temperature threshold and at or below the upper temperature threshold. Additionally, or alternatively, control module 215 may increase the write fault threshold when the current operating temperature is at or drops below the lower temperature threshold, decrease the write fault threshold when the current operating temperature is at or rises above the upper temperature threshold, and maintain the write fault threshold as long as the current operating temperature remains above the lower temperature threshold and below the upper temperature threshold.

As one example, control module 215 may configure the write fault threshold at 20% of a 50 nm wide data track, or 10 nm, enabling a magnetic head to write data to the data track without a write fault error when the magnetic head drifts no more than 10 nm from the data tracks centerline, and triggering a write fault error when the magnetic head drifts to 10 nm or more from the centerline, or drifts beyond 10 nm from the centerline. As long as the operating temperature remains at 25° C., the control module 215 may maintain the 10 nm write fault threshold. As the operating temperature varies, however, the control module 215 may increase or decrease the write fault threshold. Thus, upon determining the current operating temperature of the storage drive has risen from 25° C. to 45° C., the control module 215 may decrease the write fault threshold from 20% of data track's width to 16% of the data track's width, or from 10 nm to 8 nm for a 50 nm wide data track. Likewise, upon determining the current operating temperature of the storage drive has fallen from 55° C. to 35° C., the control module 215 may increase the write fault threshold from 12% of data track's width to 14% of the data track's width, or from 6 nm to 7 nm for a 50 nm wide data track.

In one embodiment, the control module 215 may utilize both symmetrical and asymmetrical write fault thresholds. In some embodiments, control module 215 may configure a first write fault threshold in an inner diameter (ID) direction of a centerline of at least one data track, and configure a second write fault threshold in an outer diameter (OD) direction of the centerline of the at least one data track. In some cases, the second write fault threshold may be different than the first write fault threshold. For example, one or more data tracks may include a symmetric write fault threshold where the threshold applies equally for drift in the ID direction of the centerline as it does for drift from the OD direction of the centerline. Thus, a write fault may be triggered equally when the write element drifts more than 15% in the ID direction or 15% in the OD direction for a symmetric write fault threshold. Additionally, or alternatively, one or more data tracks may include asymmetric write fault thresholds, where the threshold varies based on whether the write element drifts in the ID direction or the OD direction. For example, a data track may include a first write fault threshold of 15% in the ID direction of the data track's centerline and a second write fault threshold of 20% in the OD direction of the data track's centerline. Thus, although an error may be triggered when the write element drifts more than 15% in the ID direction, an error may not be triggered even when the write element drifts more than 15% in the OD direction, as long as the drift remains below 20% in the OD direction. Similarly, a data track may include a write fault threshold greater in the ID direction than in the OD direction, for example, 18% in the ID direction of the data track's centerline and a second write fault threshold of 14% in the OD direction of the data track's centerline, etc.

Figure 3:
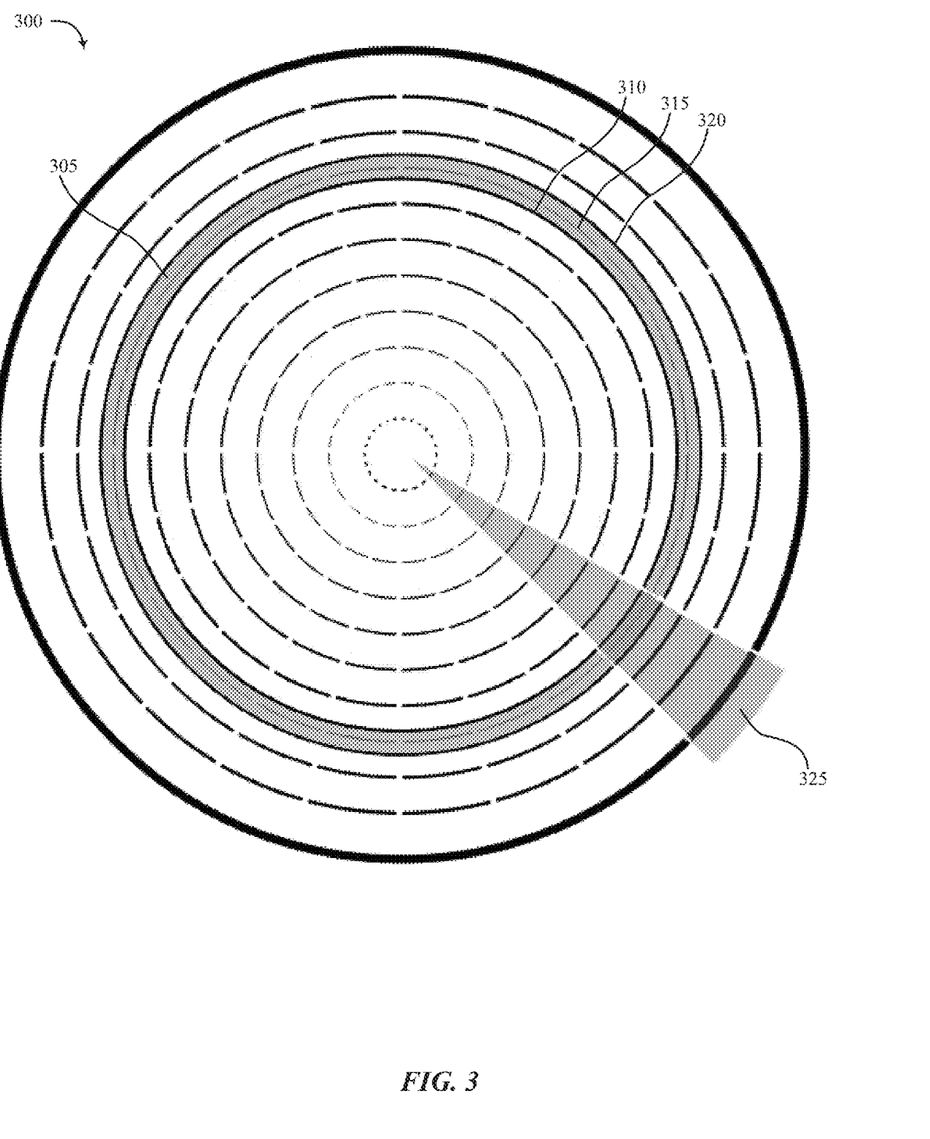
FIG. 3 shows one embodiment of a disk platter in accordance with various aspects of this disclosure.

FIG. 3 shows one embodiment of a disk platter 300 in accordance with various aspects of this disclosure. In some embodiments, disk platter 300 may be one example of disks 107 of FIG. 1. As illustrated, the disk platter 300 may include multiple data tracks indicated by the concentric dashed lines going out from the ID to the OD of the disk platter 300, including the indicated track 305, also referred to as a cylinder of disk platter 300. In one embodiment, track 305 may include an ID edge 310 of track 305, a centerline 315 of track 305, and an OD edge 320 of track 305. In some embodiments, the tracks, including track 305, may be segmented into blocks or sectors, such as sector 325 (sometimes referred to as a servo wedge), the portion of sector 325 overlapping track 305 being one of the track sectors of track 305. Accordingly, as a head (e.g., head 111 of FIG. 1) writes data to the track sectors of track 305, associated control firmware/hardware guides the head along the centerline 315 of track 305. Some drift or variance from the centerline 315 occurs as the head writes the data along track 305. If the head were allowed to deviate beyond a write fault threshold, the write operation may affect data already written in an adjacent track in the ID direction and/or OD direction. Accordingly, as long as the drift does not exceed a write fault threshold, the write operation is allowed to continue.

Figure 4A:
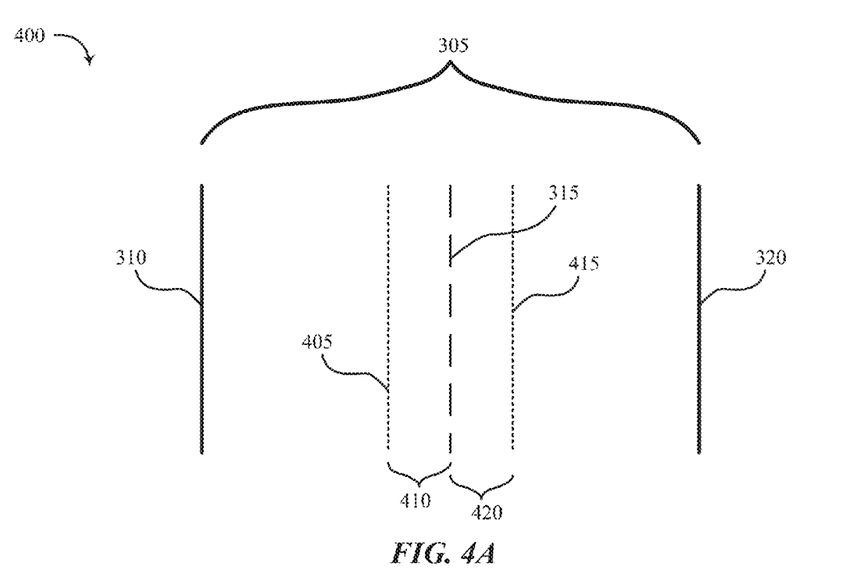
FIGS. 4A and 4B show embodiments of a portion of the disk platter of FIG. 3.

FIG. 4A shows one example of a segment 400 of a track. In some embodiments, the segment 400 may be one example of at least a portion of the track sector of track 305 from sector 325 of FIG. 3. As illustrated, segment 400 may include a portion of track 305, the ID edge 310 of track 305, the centerline 315 of track 305, and the OD edge of track 320. Associated with write operations to track 305, track 305 of FIG. 4A may include an ID write fault threshold 405 and an OD write fault threshold 415, giving an ID write fault threshold width 410 and OD write fault threshold width 420, as illustrated. As described above, a head may perform a write operation that tracks along the centerline 315. As long as the drift of the head does not exceed the thresholds 405 and/or 415, the write operation may be allowed to continue. However, when the head drifts to and/or beyond the thresholds 405 and/or 415, a write fault may be triggered, resulting in suspension or termination of the write operation.

Although the thresholds 405/415 are illustrated as having relatively the same widths 410/420, in some embodiments, the width 410 may vary from width 420. As one example, the ID write fault threshold width 410 may be less than the OD write fault threshold width 420 (i.e., threshold 405 closer to centerline 315 than threshold 415), the additional width 420 enabling the head to drift farther from centerline 315 in the OD direction than in the ID direction before a write fault is triggered.

Figure 4B:
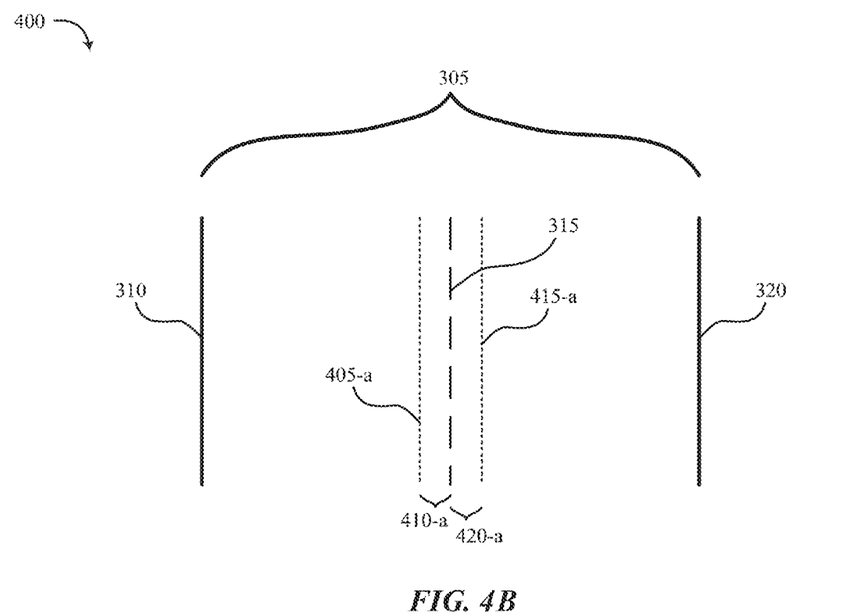

FIG. 4B shows another example of the segment 400 of a track. As illustrated, segment 400 includes a portion of track 305, the ID edge 310 of track 305, the centerline 315 of track 305, and the OD edge of track 320. Similarly, track 305 of FIG. 4B may include a modified ID write fault threshold 405-a and a modified OD write fault threshold 415, giving a modified ID write fault threshold width 410-a and modified OD write fault threshold width 420-a, as illustrated. As described above, a write fault threshold may be adjusted based on the current operating temperature of a storage drive. Thus, the thresholds 405/415 of FIG. 4A may be modified based on a current operating temperature of a storage drive associated with track 305, resulting in the modified thresholds 405-a/415-a. As illustrated, the modifications may provide narrower threshold widths 410-a and 420-a, resulting in smaller tolerances for drift while the head performs a write operation. Alternatively, the modifications may provide wider threshold widths 410-a and 420-a, resulting in larger tolerances for drift while the head performs a write operation.

Figure 5:
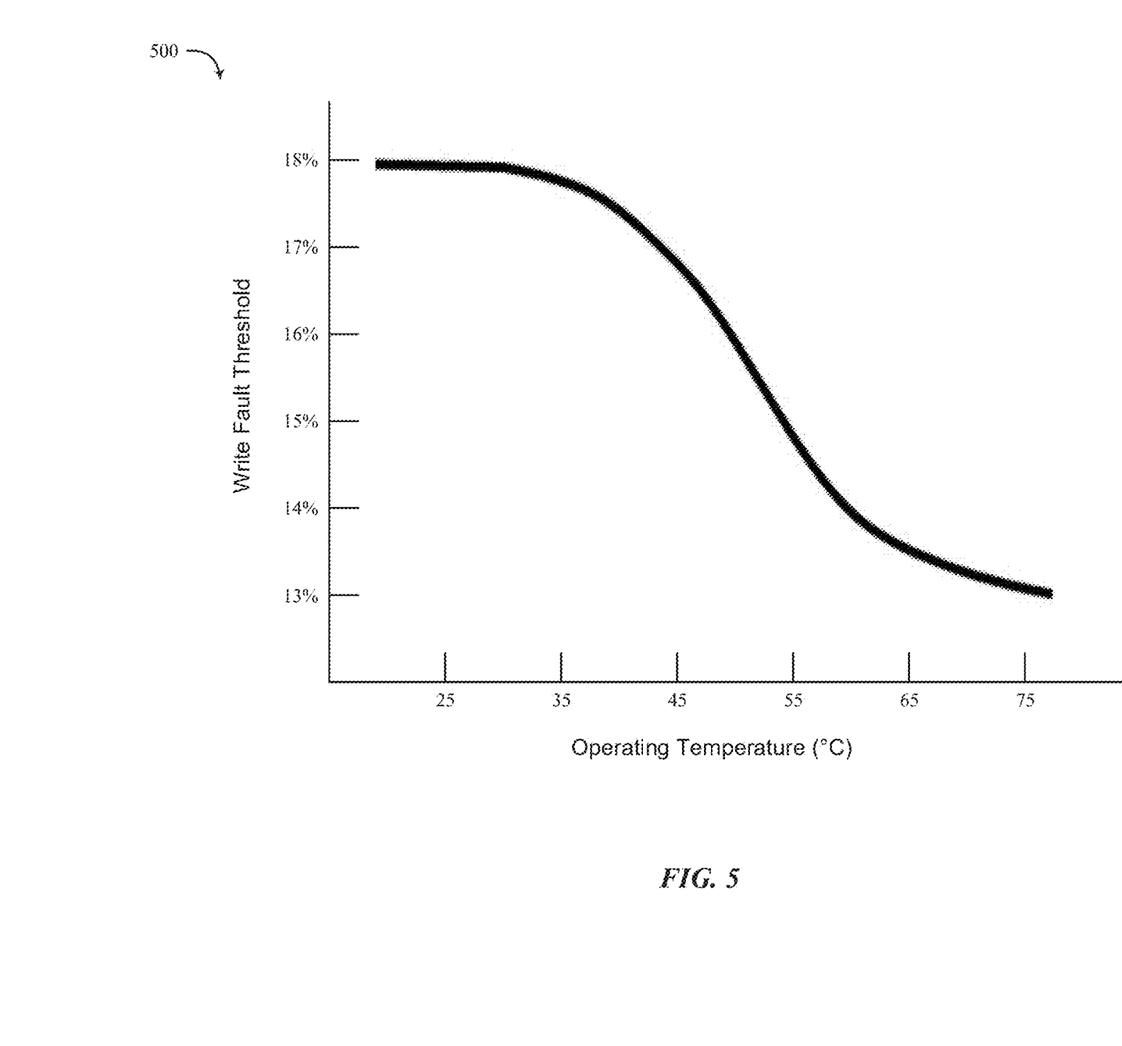
FIG. 5 shows one embodiment of a graph in accordance with various aspects of this disclosure.

FIG. 5 shows a graph 500 illustrating aspects of adaptive write fault thresholds, in accordance with various examples. At least one aspect of graph 500 may be implemented in conjunction with data storage system 100 of FIG. 1 and/or adaptive threshold module 130 from FIGS. 1 and/or 2. As depicted, graph 500 depicts an operating temperature in relation to a write fault threshold. In one embodiment, the operating temperature may relate to the current operating temperature of a storage system and/or a host of the storage system. Although depicted in degrees Celsius, the operating temperature may be provided in degrees Fahrenheit. In one embodiment, the write fault threshold may be provided in relation to percentage value of a data track's width (e.g., from an ID track edge to OD track edge, etc.). Additionally, or alternatively, the write fault threshold may be provided in relation to a measured width of a data track's total width (e.g., 10 nm towards the ID track edge, 5 nm towards the OD track edge, etc.). In one embodiment, write fault threshold may be adjusted by operating temperature to optimize the performance and mitigate encroachment of a head performing a write operation. As illustrated, an increased margin in the write fault threshold may be provided at or near room temperatures to improve performance without risk of encroachment. For example, with increased margins, a head and/or a storage medium (e.g., disk platter such as disk platter 300 of FIG. 3) may be configured to operate relatively faster with relatively larger write fault thresholds (e.g., at or near room temperature), resulting in improved performance. However, as the operating temperature increases, the write fault threshold may be narrowed or decreased to mitigate the potential for encroachment. In some embodiments, two or more graphs may be provided for a given track. For example, a first write fault threshold curve may be provided for an ID write fault threshold, and a second write fault threshold curve, different from the first write fault threshold curve, may be provided for an OD write fault threshold.

Figure 6:
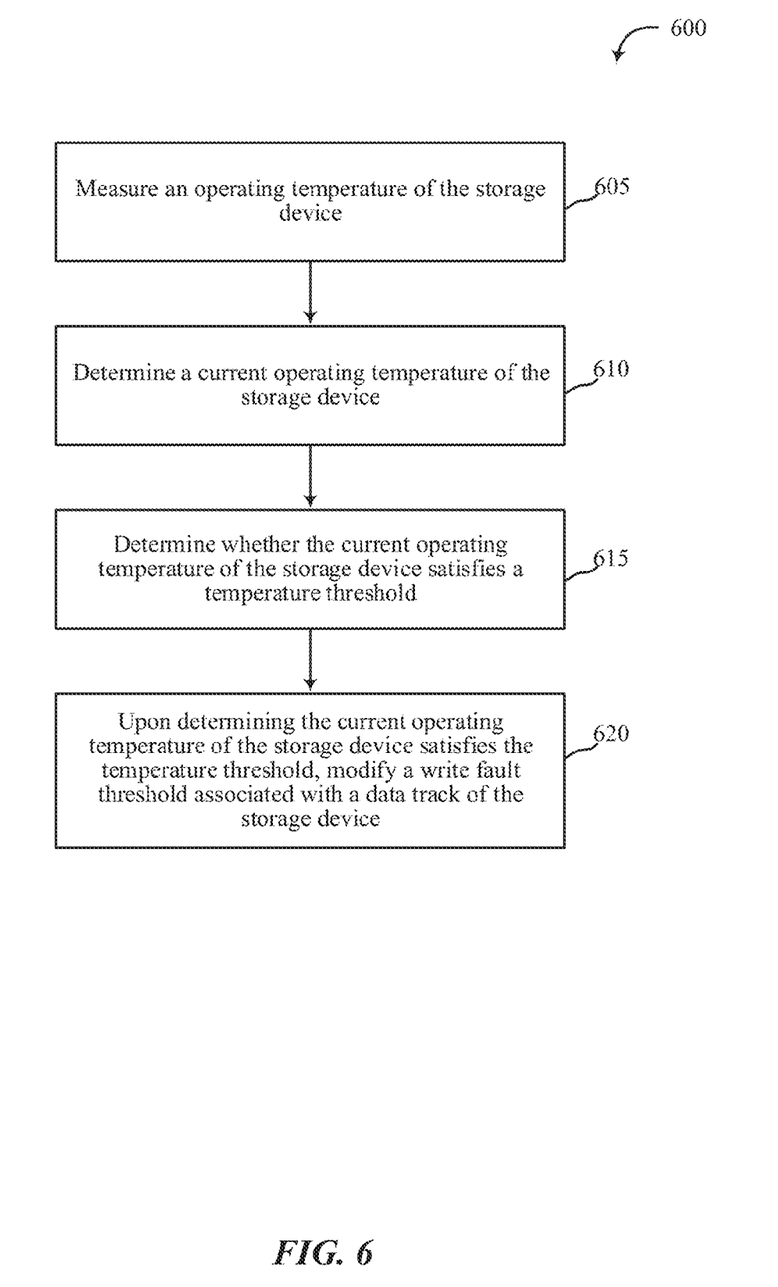
FIG. 6 is a flow chart illustrating an example of a method in accordance with various aspects of this disclosure.

FIG. 6 is a flow chart illustrating an example of a method 600 for adaptive write fault thresholds, in accordance with various aspects of the present disclosure. One or more aspects of the method 600 may be implemented in conjunction with system 100 of FIG. 1, apparatus 205 of FIG. 2, and/or adaptive threshold module 130 depicted in FIGS. 1 and/or 2. In some examples, a backend server, computing device, and/or storage device may execute one or more sets of codes to control the functional elements of the backend server, computing device, and/or storage device to perform one or more of the functions described below. Additionally or alternatively, the backend server, computing device, and/ or storage device may perform one or more of the functions described below using special-purpose hardware.

At block 605, the method 600 may include measuring an operating temperature of the storage device. At block 610, the method 600 may include determining a current operating temperature of the storage device. At block 615, the method 600 may include determining whether the current operating temperature of the storage device satisfies a temperature threshold. At block 620, upon determining the current operating temperature of the storage device satisfies the temperature threshold, the method 600 may include modifying a write fault threshold associated with a data track of the storage device.

The operation(s) at block 605-620 may be performed using the adaptive threshold module 130 described with reference to FIGS. 1 and 2 and/or another module. Thus, the method 600 may provide for adaptive write fault thresholds relating to adaptive write fault thresholds. It should be noted that the method 600 is just one implementation and that the operations of the method 600 may be rearranged, omitted, and/or otherwise modified such that other implementations are possible and contemplated.

Figure 7:
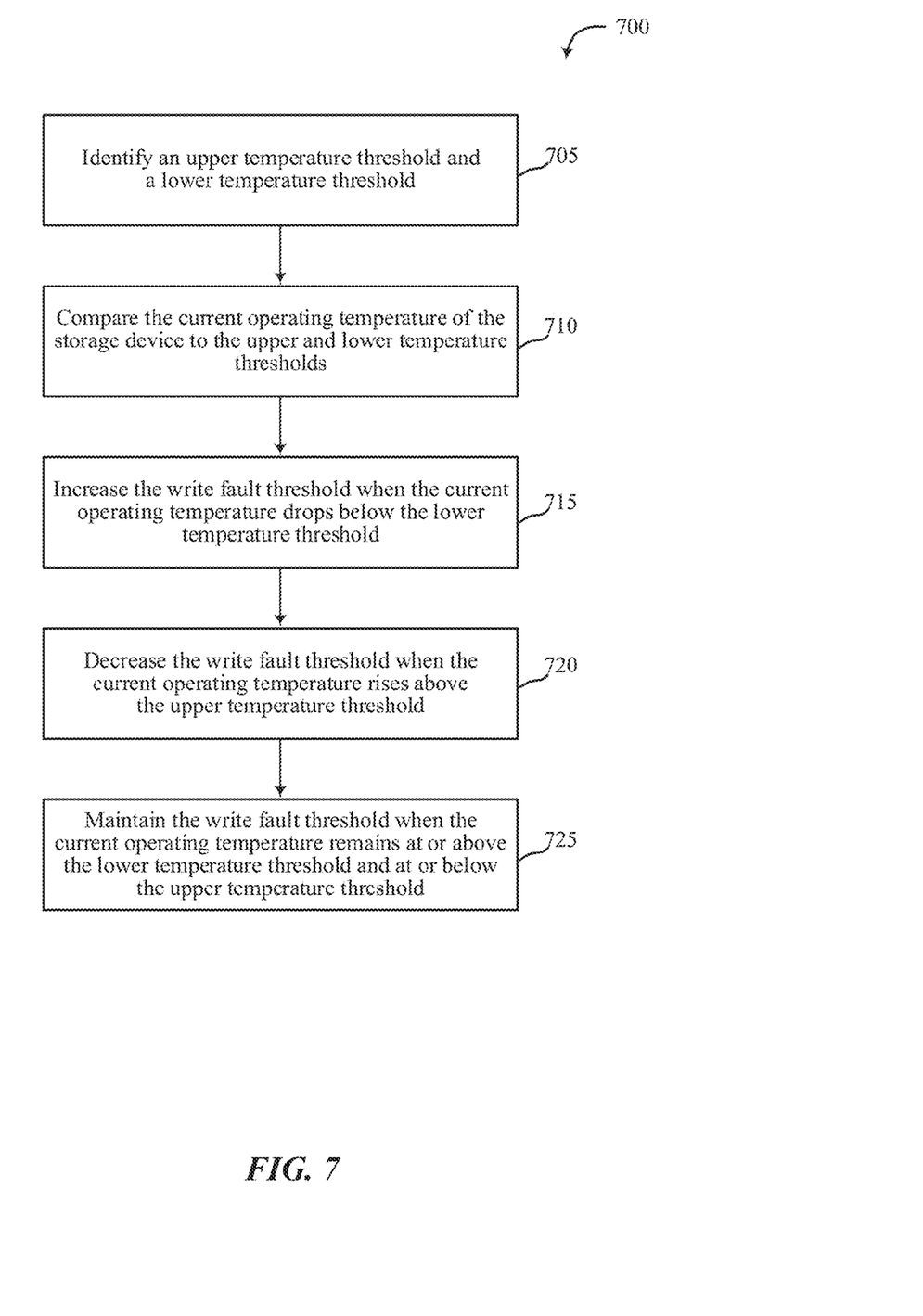
FIG. 7 is a flow chart illustrating an example of a method in accordance with various aspects of this disclosure.

FIG. 7 is a flow chart illustrating an example of a method 700 for adaptive write fault thresholds, in accordance with various aspects of the present disclosure. One or more aspects of the method 700 may be implemented in conjunction with system 100 of FIG. 1, apparatus 205 of FIG. 2, and/or adaptive threshold module 130 depicted in FIGS. 1 and/or 2. In some examples, a backend server, computing device, and/or storage device may execute one or more sets of codes to control the functional elements of the backend server, computing device, and/or storage device to perform one or more of the functions described below. Additionally or alternatively, the backend server, computing device, and/ or storage device may perform one or more of the functions described below using special-purpose hardware.

At block 705, the method 700 may include identifying an upper temperature threshold and a lower temperature threshold. In some cases, the upper and/or lower temperature thresholds may relate to a write operation on a storage device. At block 710, the method 700 may include comparing the current operating temperature of the storage device to the upper and lower temperature thresholds. At block 715, the method 700 may include increasing the write fault threshold when the current operating temperature drops below the lower temperature threshold. At block 720, the method 700 may include decreasing the write fault threshold when the current operating temperature rises above the upper temperature threshold. At block 725, the method 700 may include maintaining the write fault threshold when the current operating temperature remains at or above the lower temperature threshold and at or below the upper temperature threshold.

The operations at blocks 705-725 may be performed using the adaptive threshold module 130 described with reference to FIGS. 1 and 2 and/or another module. Thus, the method 700 may provide for adaptive write fault thresholds relating to adaptive write fault thresholds. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disk (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein, but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage device comprising:
   a storage medium comprising one or more data tracks;
   a storage controller to write, as part of a first write operation, data to a data track from the one or more data tracks in accordance with a write fault threshold at a first value, detect a position error of a magnetic head of the storage device in relation to the first write operation and the write fault threshold, and adjust the write fault threshold to a second value based at least in part on a current operating temperature associated with the storage device.

2. The storage device of claim 1, wherein a position of the magnetic head of the storage device is adjusted based at least in part on the adjusting of the write fault threshold to the second value, wherein the position of the magnetic head is adjusted in relation to a centerline of the data track.

3. The storage device of claim 2, wherein the adjusting of the write fault threshold to the second value is based on at least one of a percentage of a total width of the data track and a measured width of variation in relation to the centerline of the data track, or any combination thereof.

4. The storage device of claim 2, wherein detecting the position error in relation to the first write operation comprising:
the storage controller to compare a current position of the magnetic head in relation to a centerline of the data track, determine a degree of variance based on the comparison, and determine whether the degree of variance satisfies the first write fault threshold.

5. The storage device of claim 1, comprising:
a temperature sensor to measure the operating temperature of the storage device.

6. The storage device of claim 1, comprising:
the storage controller to suspend the first write operation upon detecting the position error.

7. The storage device of claim 6, comprising:
upon determining the position error of the magnetic head is smaller than the write fault threshold, the storage controller to continue the first write operation with the write fault threshold set to the second value, wherein the second value is different than the first value.

8. The storage device of claim 6, comprising:
upon determining the position error of the magnetic head is smaller than the write fault threshold, the storage controller to terminate the first write operation and initiate a second write operation with the write fault threshold set to the second value.

9. The storage device of claim 1, comprising:
the storage controller to store a current value of the write fault threshold in a non-volatile storage medium of the storage device.

10. The storage device of claim 1, comprising:
the storage controller to configure a first write fault threshold in an inner diameter (ID) direction of a centerline of at least one of the one or more data tracks, and configure a second write fault threshold in an outer diameter (OD) direction of the centerline of the at least one of the one or more data tracks, the second write fault threshold being different than the first write fault threshold.

11. A method for improving a storage device, comprising:
writing, as part of a first write operation performed in accordance with a write fault threshold at a first value, data to a data track from one or more data tracks of the storage device;
detecting a position error of a magnetic head of the storage device in relation to the first write operation and the write fault threshold; and
adjusting the write fault threshold to a second value based at least in part on a current operating temperature associated with the storage device.

12. The method of claim 11, wherein a position of the magnetic head of the storage device is adjusted based at least in part on the adjusting of the write fault threshold to the second value, wherein the position of the magnetic head is adjusted in relation to a centerline of the data track.

13. The method of claim 12, wherein the adjusting of the write fault threshold to the second value is based on at least one of a percentage of a total width of the data track and a measured width of variation in relation to the centerline of the data track, or any combination thereof.

14. The method of claim 11, wherein detecting the position error in relation to the first write operation comprising:
comparing a current position of the magnetic head in relation to a centerline of the data track;
determining a degree of variance based on the comparison; and
determining whether the degree of variance satisfies the first write fault threshold.

15. The method of claim 11, comprising:
measuring, via a temperature sensor, the operating temperature of the storage device.

16. The method of claim 11, comprising:
suspending the first write operation upon detecting the position error.

17. The method of claim 16, comprising:
upon determining the position error of the magnetic head is smaller than the write fault threshold, continuing the first write operation with the write fault threshold set to the second value, wherein the second value is different than the first value.

18. The method of claim 16, comprising:
upon determining the position error of the magnetic head is smaller than the write fault threshold, terminating the first write operation and initiating a second write operation with the write fault threshold set to the second value.

19. A non-transitory computer-readable storage medium storing computer executable instructions to improve a storage device that when executed by a storage controller cause the storage controller to perform the steps of:
writing, as part of a first write operation performed in accordance with a write fault threshold at a first value, data to a data track from one or more data tracks of the storage device;
detecting a position error of a magnetic head of the storage device in relation to the first write operation and the write fault threshold; and
adjusting the write fault threshold to a second value based at least in part on a current operating temperature associated with the storage device, the write fault threshold being based on a total width of the data track.

20. The storage medium of claim 19, wherein a position of the magnetic head of the storage device is adjusted based at least in part on the adjusting of the write fault threshold to the second value, wherein the position of the magnetic head is adjusted in relation to a centerline of the data track.

* * * * *